United States Patent
Lee et al.

(10) Patent No.: US 6,266,315 B1
(45) Date of Patent: Jul. 24, 2001

(54) CATADIOPTRIC OPTICAL SYSTEM, OPTICAL PICKUP AND OPTICAL DISK DRIVE EMPLOYING THE SAME, AND OPTICAL DISK

(75) Inventors: Chul-Woo Lee; Chong-Sam Chung, both of Sungnam; Yong-Moon Lee; Cheol-Sung Yeon, both of Suwon; Joong-Eon Seo, Uiwang; Young-Min Cheong; Dong-Ho Shin, both of Seoul; Kun-Mo Cho, Suwon; Pyong-Yong Seong; Jang-Hoon Yoo, both of Seoul, all of (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/196,111

(22) Filed: Nov. 20, 1998

Related U.S. Application Data
(60) Provisional application No. 60/066,414, filed on Nov. 24, 1997.

(30) Foreign Application Priority Data

Nov. 22, 1997 (KR) .................................................. 97-62146
May 29, 1998 (KR) .................................................. 98-19876

(51) Int. Cl.$^7$ ....................................................... G11B 7/00
(52) U.S. Cl. ..................................... 369/112.01; 369/118
(58) Field of Search ......................... 369/13, 118, 44.15, 369/44.23, 44.12, 112, 275.4, 244, 277, 283, 120; 428/694 ML, 900, 694 MM, 694 LE; 360/77.03

(56) References Cited

U.S. PATENT DOCUMENTS

| | | | |
|---|---|---|---|
| 4,866,694 | * 9/1989 | Korth | 369/110 |
| 5,105,408 | 4/1992 | Lee et al. | 369/44.15 |

(List continued on next page.)

FOREIGN PATENT DOCUMENTS

364196  *  4/1990  (EP) .

OTHER PUBLICATIONS

International Symposium on Optical Memory 1995, Kanazawa–city, Japan, Aug. 30–13 Sep. 1, 1995, Technical Digest, pp. 27–28.

*Primary Examiner*—Thang V. Tran
*Assistant Examiner*—Kim-Kwok Chu
(74) *Attorney, Agent, or Firm*—Staas & Halsey LLP

(57) ABSTRACT

An optical focusing system which uses a light beam emitted from a light source, includes a refractive surface on one side of the optical focusing system and having a first radius of curvature, a first reflection surface on the above one side, surrounding the refractive surface and having a second radius of curvature being different from the first radius of curvature, a transparent beam focusing surface on the other side of the optical focusing system, and a second reflection surface on the above other side and surrounding the beam focusing surface. The refractive surface refracts an incident light beam, the second reflection surface reflects a light beam refracted by the refractive surface toward the first reflection surface, and the first reflection surface focuses a laser light beam reflected from the second reflection surface on the beam focusing surface as a focused beam spot. The optical focusing system can be used in an optical pickup. The optical pickup uses the optical focusing system to generate, from a light beam e.g. laser light emitted from a light source, a beam spot used for recording or reading information to a recording medium. The optical pickup uses a near field effect provided by an optical focusing system according to the present invention, to allow a superior density of recording or reading. Further, the optical focusing system according to the invention can use a light beam having a beam diameter smaller than that of the laser beam used for an existing optical focusing system for forming a near field. Thus, the optical pickup according to the invention can record or read information on an optical disk having a surface recording density of 10 Gbit/inch$^2$ or more. Even if an incident light beam inclination occurs due to movement of the disk or the optical pickup, information can be recorded on or read from a disk accurately. Also, the assembly of the optical focusing system and the adjustment of the assembled optical focusing system are easily performed.

66 Claims, 15 Drawing Sheets

U.S. PATENT DOCUMENTS

| | | | |
|---|---|---|---|
| 5,150,338 | 9/1992 | Birecki et al. | 369/13 |
| 5,202,880 | 4/1993 | Lee et al. | 369/275.4 |
| 5,389,455 * | 2/1995 | Saito et al. | 369/13 |
| 5,481,386 | 1/1996 | Shimano et al. | 369/44.12 |
| 5,497,359 | 3/1996 | Mamin et al. | 369/44.15 |
| 5,615,203 | 3/1997 | Fukakusa | 369/244 |
| 5,748,172 | 5/1998 | Song et al. | 345/111 |
| 5,889,641 * | 3/1999 | Belser et al. | 369/113 |
| 5,901,118 * | 5/1999 | Iketani et al. | 369/13 |
| 5,978,139 * | 11/1999 | Hatakoshi et al. | 369/112 |

* cited by examiner

CATADIOPTRIC OPTICAL SYSTEM, OPTICAL PICKUP AND OPTICAL DISK DRIVE EMPLOYING THE SAME, AND OPTICAL DISK

This application claims benefit of provisional application 60/066,414 filed Nov. 24, 1997.

BACKGROUND OF THE INVENTION

1. Field of the Invention

The present invention relates to a catadioptric optical system, an optical pickup and an optical disk drive employing the optical focusing system, and a digital data storage medium on which information is recorded and from which information is read by the optical pickup and the optical disk drive.

2. Description of the Related Art

Various methods for increasing a recording capacity in an optical recording and/or reproducing apparatus have been studied. Those basic approaches are to reduce the wavelength of used light and to heighten a numerical aperture (NA) of a used objective lens, thereby reducing the size of a focused light spot. An optical focusing system for reducing the size of a focused light spot by heightening the numerical aperture is described with reference to FIG. 1.

The optical focusing system shown in FIG. 1 which reduces the size of a focused light spot using a near field, includes an aspherical lens 1 and a spherical lens 2 called a solid immersion lens. When the optical focusing system is used as an objective lens for an optical disk 4, a slider 3 carries the spherical lens 2 over the surface of the disk 4, and maintains the distance between the spherical lens 2 and the disk 4 to be less than 100 nm. The aspherical lens 1 refracts a laser light beam emitted from a light source (not shown), and the spherical lens 2 focuses the laser light beam refracted by the aspherical lens 1 on the inside of its surface faced to the disk 4. The surface of the spherical lens 2 on which the laser light beam is focused forms a near field, and thus information is recorded on or read from the disk 4 via the near field.

In the case that a material constituting the spherical lens 2 has a refractive index "n", in the inside of the spherical lens 2, the converging angle of a laser light beam becomes large and momentum of the laser light is reduced. Consequently, a wavelength of the laser light beam is reduced to $\lambda/n$. The numerical aperture (NA) is also increased to $NA/\lambda$. Thus, a size of the light spot which is finally formed in the inside of the surface of the spherical lens 2 is proportional to $NA/\lambda$. As a result, the size of the spot can be reduced using the refractive index "n" of the medium of the spherical lens 2.

However, the optical focusing system of FIG. 1 includes the aspherical lens 1 and the spherical lens 2 which are separately manufactured. Accordingly, it is hard to assemble or adjust the optical focusing system so that a desired optical characteristic is obtained. Since the optical focusing system requires incident laser light having a beam diameter more than or equal to 3 mm, the size of all optical components including a light reception unit are enlarged. As well, in the case where the inclination of incident beam that a laser beam deviates from a normally used angle with respect to an optical disk occurs due to sway of a moving optical pickup or a rotating optical disk, it is difficult to record or reproduce a signal normally.

Further, the shortest wavelength of light of a currently available laser diode light source is about 600 nm.

Also, the numerical aperture of the objective lens is approximately 0.6 at present. Thus, in the case where a numerical aperture of 0.6 or more is required, performance of an optical pickup is much sensitive to inclination of an incident beam. Accordingly, it is difficult to use the existing optical focusing system in order to commercialize an optical recording and/or reproducing apparatus.

SUMMARY OF THE INVENTION

Thus, it is a first object of the present invention to provide an optical focusing system for focusing a light beam using a novel optical system, to thereby have an excellent performance with respect to an incident beam inclination, make optical components compact and reduce the size of a focused light spot.

A second object of the present invention is to provide an optical pickup employing the above optical focusing system.

A third object of the present invention is to provide a method for fabricating the above optical focusing system.

A fourth object of the present invention is to provide an optical disk driver employing the above optical focusing system.

A fifth object of the present invention is to provide an optical pickup including a readout layer for amplifying a light beam containing information recorded on an optical disk.

A sixth object of the present invention is to provide an optical disk to allow more precise read of recorded information.

To accomplish the first object of the present invention, there is provided an optical focusing system for use with a light beam for forming a focused beam spot. The optical focusing system comprises, a refractive surface on one side of the optical focusing system and having a first radius of curvature; a first reflection surface on said one side, surrounding the refractive surface and having a second radius of curvature being different from the first radius of curvature; a transparent beam focusing surface on the other side of the optical focusing system; and a second reflection surface on said other side and surrounding the beam focusing surface, wherein the refractive surface refracts an incident light beam, the second reflection surface reflects a light beam refracted by the refractive surface toward the first reflection surface, and the first reflection surface focuses a laser light beam reflected from the second reflection surface on the beam focusing surface, as a focused beam spot.

The second object of the present invention is accomplished by an optical pickup for an optical disk. The optical pickup which records and/or reads information to an optical disk using a focused beam spot, comprises, a light source;

optical detection means;

an optical head comprising,
a refractive surface on one side of the optical head and having a first radius of curvature;
a first reflection surface on said one side, surrounding the refractive surface and having a second radius of curvature being different from the first radius of curvature;
a transparent beam focusing surface on the other side of the optical head; and
a second reflection surface on said other side and surrounding the beam focusing surface,
wherein the refractive surface refracts an incident light beam, the second reflection surface reflects a light beam refracted by the refractive surface toward the first reflection surface, and the first reflection surface focuses a laser light beam reflected from the second reflection surface on the beam focusing surface as a focused beam spot, optical path altering means for transferring a light beam emitted from the light source to the refractive surface of the optical head and transferring a light beam outgoing from the refractive surface to said optical detection means; and a supporting means to which the optical head is attached, elastically supporting the optical head so that the optical head moves in the direction perpendicular to said loaded optical disk, within a predetermined distance from said loaded optical disk.

The third object of the present invention is accomplished by a method for manufacturing an optical focusing system which use with a light beam for forming a focused beam spot and comprises, a concave refractive surface on one side of the optical focusing system and having a first radius of curvature, a convex first reflection surface on said one side, surrounding the refractive surface and having a second radius of curvature being different from the first radius of curvature, a transparent beam focusing surface on the other side of the optical focusing system, and a second reflection surface on said other side and surrounding the beam focusing surface, wherein the refractive surface refracts an incident light beam, the second reflection surface reflects a light beam refracted by the refractive surface toward the first reflection surface, and the first reflection surface focuses a laser light beam reflected from the second reflection surface on the beam focusing surface, the manufacturing method comprising a step of:

fabricating a mold for the refractive surface and the first reflection surface from a primary mold plate.

A diamond cutting method is used in the step of fabricating, and the step of fabricating comprises sub-steps of:

cutting the primary mold plate, to create a first mold for a shape of the first reflection surface;

forming, in the first mold, a through hole in which a second mold for a shape of the refractive surface is inserted; and inserting the second mold into the through bole formed in the first mold.

Also, the present invention provides an optical disk drive for recording and/or reading information to an optical disk using a focused beam spot, the optical disk drive comprising:

a base;

a light source;

a reflector;

optical detection means;

an optical head comprising, a refractive surface on one side of the optical head and having a first radius of curvature;

a first reflection surface on said one side, surrounding the refractive surface and having a second radius of curvature being different from the first radius of curvature;

a transparent beam focusing surface on the other side of the optical head; and a second reflection surface on said other side and surrounding the beam focusing surface, wherein the refractive surface refracts a light beam incident from the reflector, the second reflection surface reflects a light beam refracted by the refractive surface toward the first reflection surface, and the first reflection surface focuses a laser light beam reflected from the second reflection surface on the beam focusing surface as a focused beam spot, optical path altering means for transferring a light beam emitted from the light source to the reflector and transferring a light beam reflected from the refractive surface to said optical detection means; and a supporting means to which the optical head is attached, elastically supporting the optical head so that the optical head moves in the direction perpendicular to said loaded optical disk, within a predetermined distance from said loaded optical disk.

There is also provided an optical pickup for reading information from an optical disk using a near field, the optical pickup comprising:

an optical focusing system for generating a near field for reading information from a loaded optical disk; and a readout layer attached on a optical surface of the optical focusing system facing toward said loaded optical disk, for amplifying a reflected light beam containing information recorded on a recording layer of said loaded optical disk.

It is also provided an optical disk for use with an optical pickup for using a near field for reading information, the optical disk comprising:

a substrate;

a recording layer applied over the substrate and on which information is recorded;

a readout layer applied on the recording layer, for amplifying a light beam containing information recorded on the recording layer;

a dielectric layer applied on the readout layer; and an overcoat layer applied on the dielectric layer.

BRIEF DESCRIPTION OF THE DRAWINGS

The preferred embodiments are described with reference to the drawings, wherein.

DETAILED DESCRIPTION OF THE INVENTION

Preferred embodiments of the present invention will be described with reference to the accompanying drawings.

Figure 2:
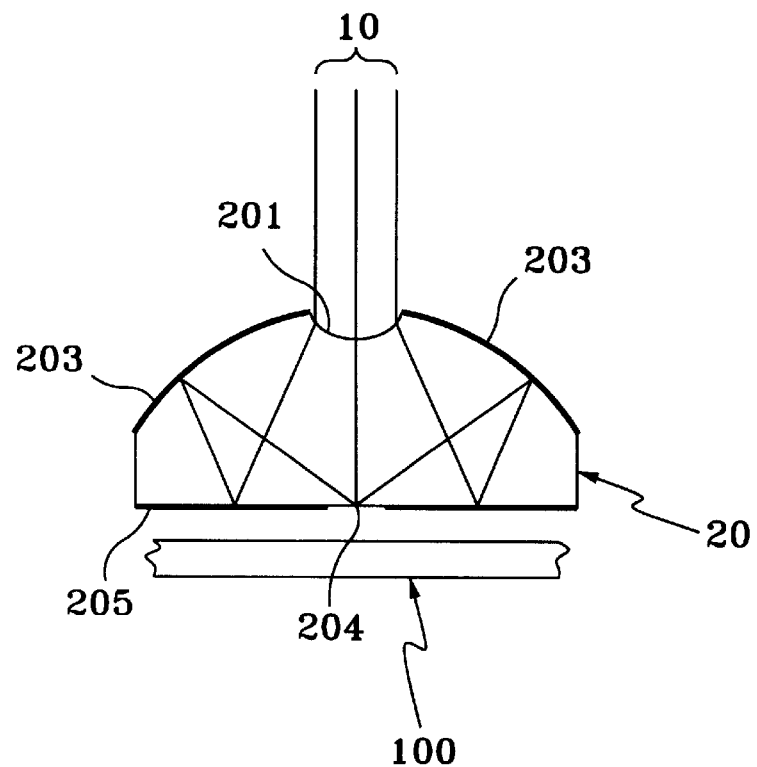
FIG. 2 is a view for explaining an optical focusing system according to a preferred embodiment of the present invention.

Referring to FIG. 2, an optical focusing system 20 according to an embodiment of the present invention includes a refractive surface 201 and a first reflection surface 203 both which are located toward a light source (not shown), and a beam focusing surface 204 and a second reflection portion 205 both which are located toward an optical disk 100. In the optical focusing system 20, the first and second surfaces 203 and 205 have total reflection characteristics given by means of a coating and so on. However, the refractive surface 201 and the beam focusing surface 204 are not processed by a reflection coating, and have a light transmission characteristic. The refractive surface 201 and the beam focusing surface 204 include the optical axis of the optical focusing system 20. The first reflection surface 203 is disposed at the outer area of the refractive surface 201, and the second reflection surface 205 is disposed at the outer area of the beam focusing surface 204. An optical surface which is composed of the beam focusing surface 204 and the second reflection surface 205 has a shape of a plane surface or a curved shape close to the plane surface.

The refractive surface 201 which has a shape of a spherical surface being concave or recessed toward the beam focusing surface 204. the first reflection surface 203 has an aspherical shape. The refractive surface has a first radius of curvature and the first reflection surface has a second radius of curvature having an absolute value larger than that of the first radius of curvature. According to convention of signs, all convex surfaces have a positive radius of curvature and all concave surfaces have a negative radius of curvature. Therefore, the refractive surface 201 has the first radius of curvature of the negative sign and the first reflection surface 203 has the second radius of curvature of the negative sign. The optical focusing system 20 is designed so that the aperture of the refractive surface 201 is sufficiently smaller than that of the optical focusing system 20. That is, the optical focusing system is designed so that on the optical surface of the optical focusing system 20 located on the light source side, the refractive surface 201 has much smaller occupancy than the first reflection surface 203. Also, the optical focusing system is designed so that most of the laser light beam having been reflected from the first reflection surface 203 is focused on the beam focusing surface 204.

The refractive surface 201 refracts a light beam incident from a light source in a divergent form. The first reflection surface 203 reflects the light beam reflected so from the second reflection portion 205 after being refracted by the refractive portion 201, toward the beam focusing surface 204 positioned on the center of the optical surface which is located toward the optical disk 100. Thus, the optical focusing system 20 of FIG. 2 focuses most of the light beam 10 incident through the refractive portion 201 on the beam focusing surface 204 as a light spot. As a result, a beam spot generating a near field used for recording and/or reading information to the optical disk 100 is formed on the beam focusing surface 204. The first reflection surface 203 reflects external or ambient light incident to the surface thereof. The second reflection surface 205 also reflects external light.

In this embodiment, an aperture of the refractive portion 201, that is, a width of the refractive portion 201 perpendicular to the longitudinal axis of the light beam 10, is approximately 0.8 mm. A light spot focused on the beam focusing surface 204 is approximately 0.35 $\mu$m in size and forms a near field called an "evanescent field". As well known, a near filed is an electromagnetic field existing within one wavelength of use light. Therefore, when a surface of the optical disk 100 is located within the distance of one wavelength of the light beam 10 from the beam focusing surface 204 of the optical focusing system 20, information can be recorded on or read from the information recording surface of the optical disk 100 located in the neighborhood of the beam focusing surface 204 via the near field. Preferably, the distance between the surface of the beam focusing surface 204 and a surface of the optical disk 100 located toward the optical focusing system 20 is less than 100 nm.

Figure 1:
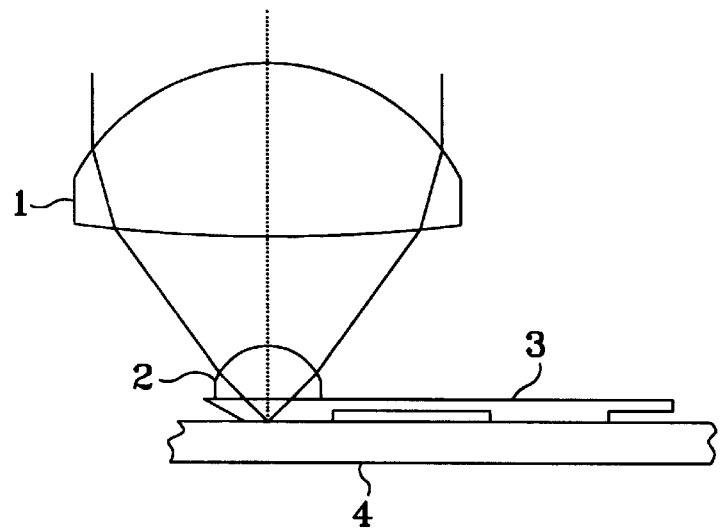
FIG. 1 is a view for explaining a conventional optical focusing system for generating a near field.

Also, the optical focusing system 20 of FIG. 2 uses the light beam 10 incident through only the refractive surface 201. Therefore a desired light spot can be obtained with only the light beam having a much smaller beam diameter, compared with the optical focusing system of FIG. 1. Preferably, the beam diameter of the light beam 10 used is less than 1 mm. Thus, when it is used in an optical pickup, the optical focusing system 20 of FIG. 2 can reduce the size of all optical components including a light reception unit, compared with the optical focusing system of FIG. 1. The optical focusing system 20 per se can be used in a conventional optical pickup which uses the laser beam having a beam diameter of 3 mm.

The above optical focusing system 20 of FIG. 2 can be used in an optical pickup for an emboss-pit optical disk, and an optical pickup for a phase-change optical disk which allows both recording and reading.

Hereinafter, for clarity of explanation, a reflection surface located at the same side as the refractive surface is defined as a "first reflection surface" and a reflection surface located at the same side as the beam focusing surface is defined as a "second reflection surface".

Figure 3A:
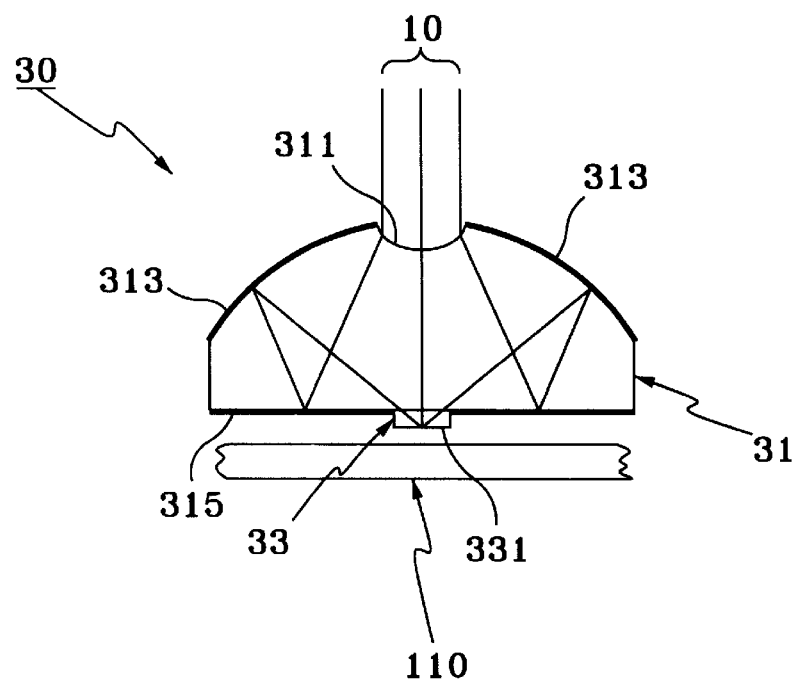
FIGS. 3A through 3C are views for explaining optical focusing systems for a magneto-optical disk which are modified from the optical focusing system shown in FIG. 2.
Figure 3B:
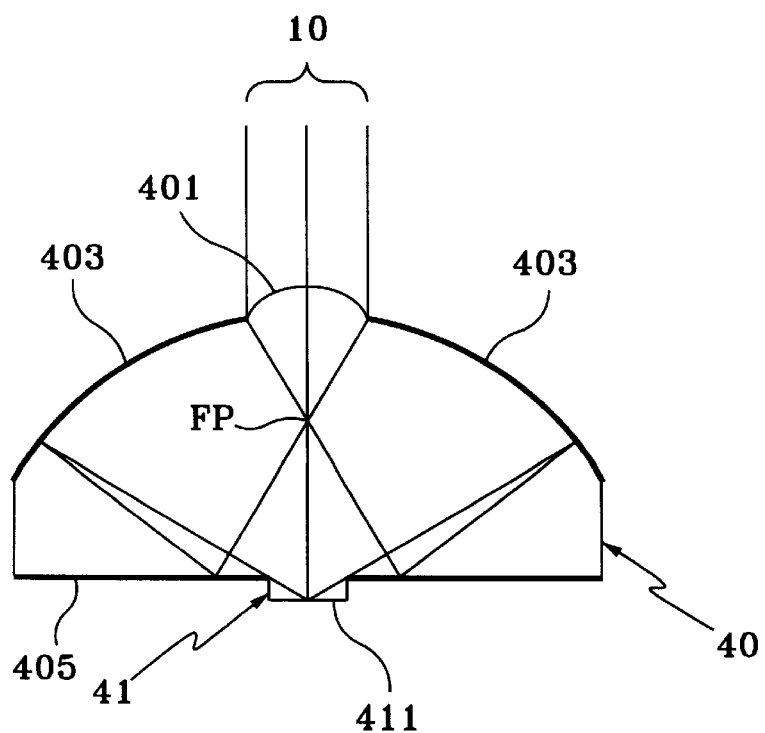
Figure 3C:
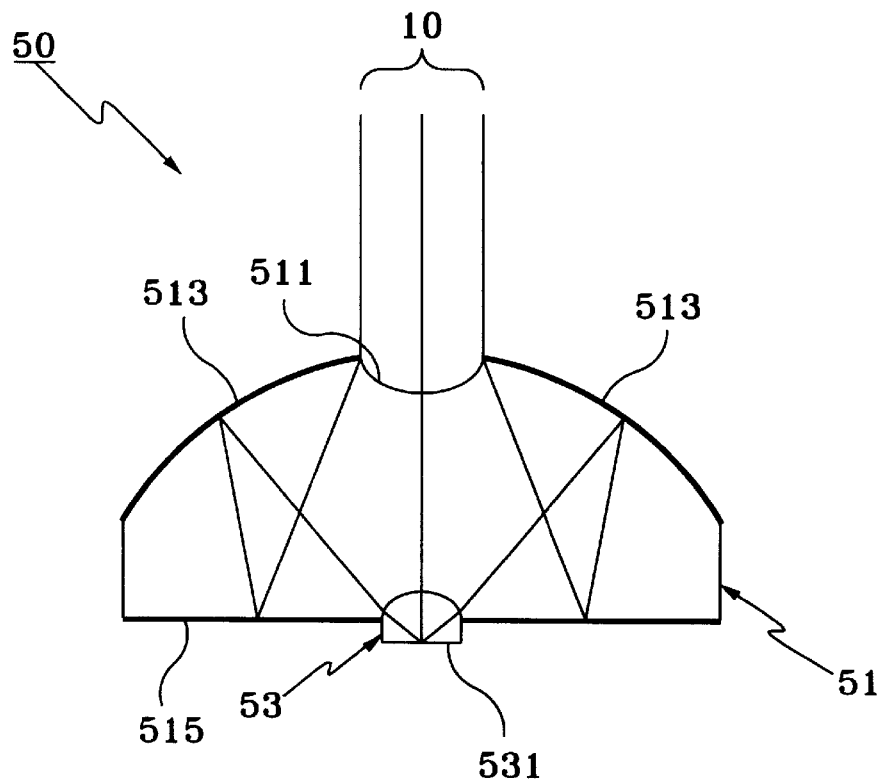

FIGS. 3A to 3C show optical focusing systems which are modified from the optical focusing system shown in FIG. 2 so that modifications are appropriate for a magneto-optical disk. The optical focusing system 30 shown in FIG. 3A includes a focusing element 31 and a beam focusing portion 33. The beam focusing portion 33 is formed on the optical focusing system 30 to have the same optical center as that of a surface of the optical focusing system 30 which is located toward the magneto-optical disk 110, and has a cylindrical shape. The focusing element 31 includes a refractive surface 311 and a first reflection surface 313 which form a surface of the optical focusing system 30 located toward a light source, and a second reflection surface 315 forming the surface of the focusing element 31 located toward the magneto-optical disk 110, excluding the part occupied by the beam focusing portion 33.

The beam focusing portion 33 has a thickness and shape appropriate for attaching thereto a magnet coil which is used for magnetic-recording/reading to the magneto-optical disk 110. In this embodiment, the beam focusing portion 33 has a cylindrical shape. Here, the thickness of the near field former 33 is the height of the near field former 33 protruded from a surface of the second reflection surface 315 of the focusing element 31. The second reflection surface 315 has a reflection characteristic for reflecting internal or external incident light, and the reflection characteristic is given via a metal coating.

The refractive surface 311 refracts an incident light beam 10 in a divergent form. The second reflection surface 315 reflects the light beam being refracted by refractive portion 311 toward the first reflection surface 313. The first reflection surface 313 reflects the incident laser light reflected from the second reflection portion 315 toward the beam focusing portion 33. The light spot finally focused by the optical focusing system of FIG. 3A is formed on a focusing surface 331 of the near field former 33 being placed toward the magneto-optical disk 110. Therefore, each of the refractive surface 311 and the first reflection surface 313 has a curvature slightly differed from a corresponding one of the refractive surface 201 and the first reflection surface 203 of FIG. 2. In this case, the refractive surface 311 has a radius of curvature having an absolute value less than that of a radius of curvature possessed by the first reflection surface 313. The second reflection surface 315 has a plane surface or a curved surface close to the plane surface as in the second reflection surface 205 being located toward the optical disk 100 in the optical focusing system 20 of FIG. 2.

An amount of the light beam proceeding toward the focusing surface 331 on which a light spot is formed relies on the thickness of the beam focusing portion 33. The more the thickness of the near field former 33 is thin, the more the laser light reaches the focusing surface 331. Therefore, when the first reflection surface 313 blocks less than 30% of the light beam 10 incident through the refractive surface 311, the thickness of the beam focusing portion 33 is determined so that the second reflection surface 315 does not block more than 30% of the light beam 10.

According to an experimental result tested for design of the optical focusing system of FIG. 3A, when the focusing element 31 and the beam focusing portion 33 are made of a material having a refractive index of 1.84, the thickness of the beam focusing portion 33 is preferably within the range of about 0.1–0.2 mm. More preferably, it is about 0.13 mm. When the thickness of the beam focusing portion 33 is 0.13 mm, the diameter of an area occupied by the focusing surface 331 of the near field former 33 on the optical surface facing the optical disk 100 is 0.5 mm. When the beam focusing portion 33 is designed to satisfy the above conditions, the optical focusing system 30 has a numerical aperture of 1.5 and a focal length of 0.477 mm, the optical surface of the system 30 facing the optical disk 100 has an effective diameter of 3.4 mm, and a beam diameter of the incident laser light beam 10 is 0.78 mm. Therefore, when the optical focusing system of FIG. 3A is used for an optical pickup, information can be recorded on or read from a magneto-optical disk at a surface recording density of 10 Gbit/inch$^2$ or more. In the case where the beam focusing portion 33 is fabricated by using a material having a refractive index of 1.58, the focusing element 31 can be designed to have a numerical aperture of 1.1.

FIG. 3B shows an optical focusing system 40 which is modified from the optical focusing system 30 shown in FIG. 3A. The optical focusing system 40 of FIG. 3B is manufactured as a single optical element, and has a refractive surface 401 which is formed in the optical surface located toward a light source (not shown) and is convex toward the light source. The refractive surface 401 has a radius of curvature having an absolute value less than that of the radius of curvature possessed by the first reflection surface 403. The radius of curvature of the refractive surface 401 has the positive sign according to Convention of signs. The refractive surface 401 refracts an incident light beam 10 in the convergent form so that a focal point FP is formed in the inside of the optical focusing system 40. A second reflection surface 405 having a plane shape or a curved shape close to the plane surface reflects the light beam refracted by the refractive surface 401 toward a first reflection surface 403. The first reflection surface 403 reflects the light beam incident from the second reflection surface 405 toward a beam focusing portion 41 having a circular plate shape. The optical focusing system 40 shown in FIG. 3B has substantially the same structure as that of the optical focusing system of FIG. 3A, except that the refractive surface 401 is convex toward the opposite side to the refractive surface 311 of FIG. 3A. Therefore, the light beam reflected from the first reflection surface 403 is focused, as a light spot, on a focusing surface 411 of the beam focusing portion 41.

FIG. 3C shows another modification of the optical focusing system 30 shown in FIG. 3A. The optical focusing system 50 shown in FIG. 3C includes a focusing element 51 and a beam focusing portion 53. The focusing element 51 includes a refractive surface 511 having a concave or recessed shape, a first reflection surface 513 of an aspherical shape, and a second reflection surface 515 having a shape of a plane surface or a curved surface close to the plane surface. The beam focusing portion 53 is formed on a surface of the focusing element 51 being located toward the magneto-optical disk 110, in the manner that the beam focusing portion 53 is centered on the optical axis of the optical focusing system 51. The beam focusing portion 53 has a cylindrical shape in which the optical axis is coincident with the optical axis of the focusing element 51 and the surface facing toward the refractive portion 511 is convex. A surface 531 of the beam focusing portion 53 is the focusing surface on which incident light beam 10 is focused as a final light spot. The refractive surface 511 refracts an incident light beam 10 in the divergent form. The second reflection surface 515 being located toward the magneto-optical disk 110 reflects the light beam refracted by the refractive surface 511 toward the first reflection surface 513. The first reflection surface 513 focuses the light beam reflected from the second reflection surface 515 on the focusing surface 531 beam focusing portion 53. As a result, a near field is formed by a light spot focused on the focusing surface 531.

The beam focusing portion 53 is designed to have a higher refractive index than that of the focusing element 51. Accordingly, the light beam incident to the beam focusing portion 53 is further converged by the beam focusing portion 53. For example, the focusing element 51 is made of a general optical glass having a refractive index of about 1.55. The beam focusing portion 53 is made of GaAs having a refractive index of about 3. Therefore, the size of a light spot formed on the focusing surface 531 is half the size of the light spot formed by the optical focusing system of FIG. 3A.

The optical focusing systems shown in FIGS. 3A to 3C can be used for an emboss-pit optical disk, a phase-change optical disk and a magneto- optical disk.

Figure 4A:
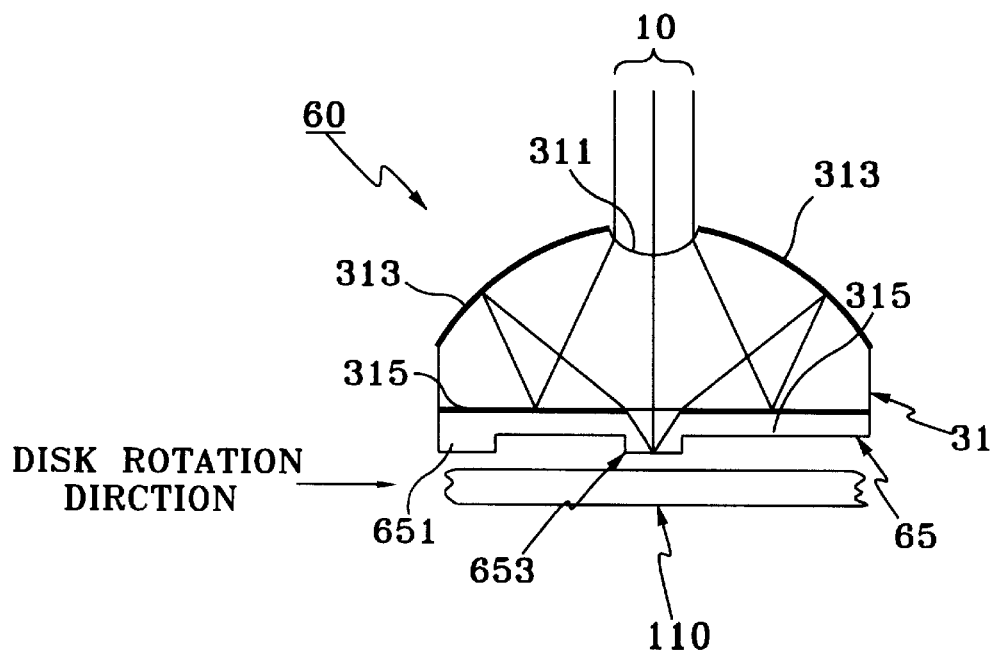
FIGS. 4A through 4C are views for explaining modifications of the optical focusing system shown in FIG. 3A which form an air bearing on a surface of an optical disk.
Figure 4B:
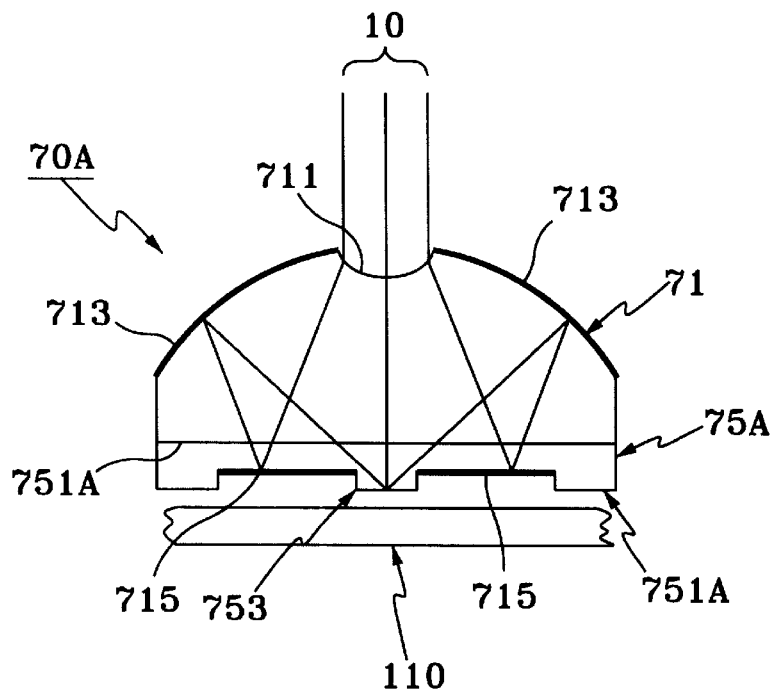
Figure 4C:
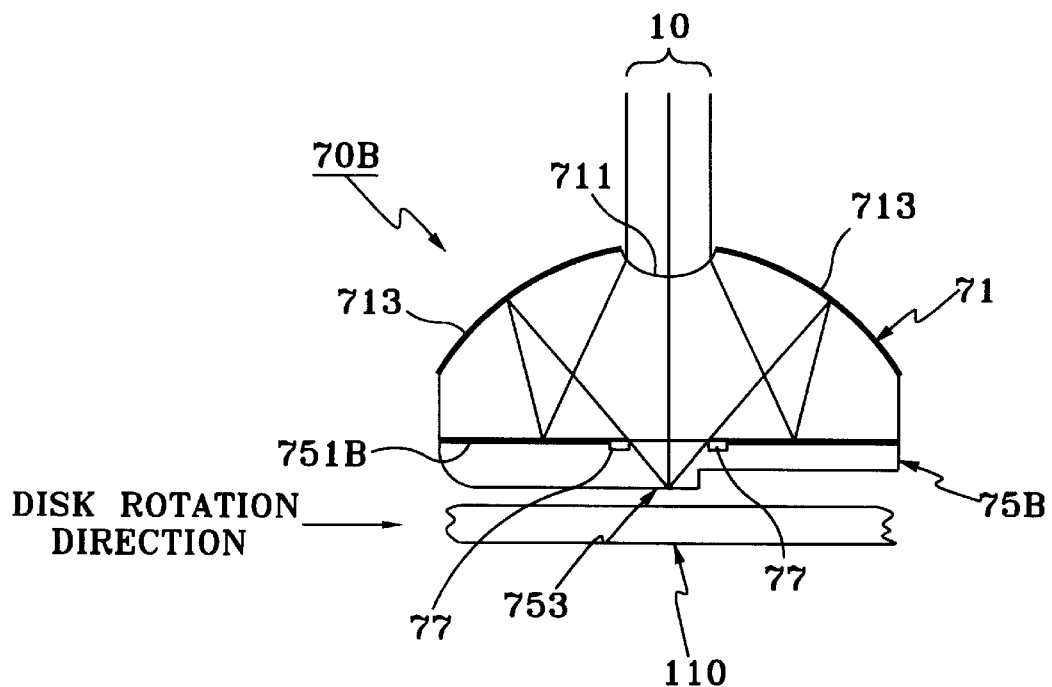

FIGS. 4A to 4C show optical heads employing the optical focusing system according to the present invention.

FIG. 4A shows an optical head 60 in which instead of the beam focusing portion 33 of FIG. 3A, a slider 65 is attached on the surface of the focusing element 31 located toward the disk 110. The slider 65 which is made of a material having a smaller refractive index than that of the focusing element 31, is attached to the surface of the disk of the focusing element 31 by using an adhesive. The slider 65 includes a protrusion 651 located at a relatively forward part of the slider 65 with respect to rotational movement of the magneto-optical disk 110, and a beam focusing portion 653 having the same optical axis as that of the focusing element 31. A light beam 10 is focused on a surface of the beam focusing portion 653 positioned toward the disk by the focusing element 31, and thus a near field is generated from the surface of the beam focusing portion 653. The protrusion 651 forms air bearing between the slider 65 and the magneto-optical disk 110 when rotating the magneto-optical disk 110.

FIG. 4B shows an optical head 70A that the optical focusing system 30 shown in FIG. 3A is modified to include a focusing element 71 and a slider 75A. The focusing element 71 and the slider 75A are made of materials having the same refractive index and are attached to each other with an adhesive having the same refractive index as that of the focusing element 71 or the slider 75A. In FIG. 4B, reference numeral 711 denotes a refractive surface, 713 is a first reflection surface, 715 is a second reflection surface, 751A is a protrusion, and 753 a beam focusing surface.

FIG. 4C shows an optical head 70B including a slider 75B having a different shape from that of the slider 75A shown in FIG. 4B. Elements shown in FIG. 4C have substantially the same shapes and functions as those having the same reference numeral in FIG. 4B. The slider 75B has a groove for applying a magnet coil for recording information on the magneto-optical disk 110.

Figure 5A:
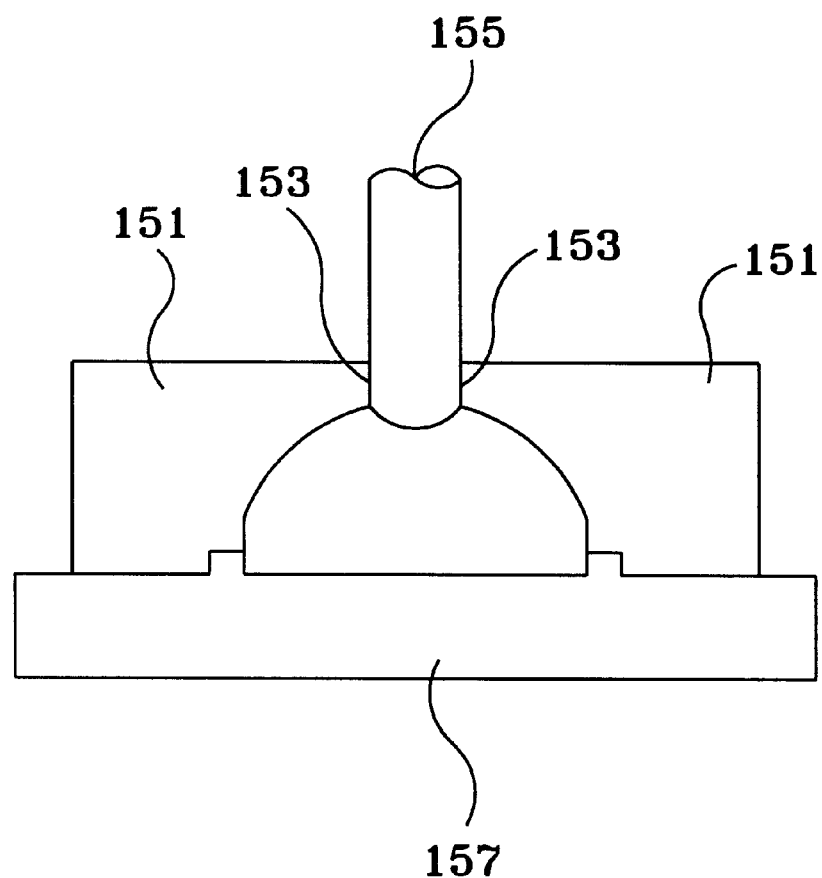
FIGS. 5A and 5B are views for explaining a manufacturing method of the optical focusing system shown in FIG. 2.

FIG. 5A is a view for explaining a manufacturing method of the optical focusing systems or the focusing elements. For clarity of explanation, the manufacturing method of the optical focusing system shown in FIG. 2 is described as an example. A molding is used to form a shape of the optical focusing system 20 shown in FIG. 2. An upper mold composed of molds 151 and 155 and a lower mold 157 are used in order to form the optical focusing system 20. For fabrication of the upper mold, a mold for forming the first reflection surface 203 is fabricated by cutting a primary mold plate having a thickness sufficient for shaping the refractive surface 201 and the first reflection surface 203. Subsequently, a through-hole 153 for inserting the mold 155 is provided so that the mold 151 is fabricated completely. At this time, the inner surface of the mold 151 for forming the surface of the first reflection surface 203 is fabricated via diamond cutting. The mold 155 for forming the refractive surface 201 is separately fabricated.

Once the molds 151 and 153 are fabricated, the mold 153 is inserted into the through-hole 153 of the mold 151 to form a complete upper mold. When the upper mold is made using such a method, a portion where the refractive surface 201 and the first reflection surface 203 meet does not rounded. Therefore, it is allowed that the upper mold is fabricated using only the diamond cutting. Next, the upper mold and the lower mold 157 are assembled as a mold assembly and then the mold assembly is used for molding the optical focusing system 20 from a medium having a desired refractive index. When a shape of the optical focusing system 20 is molded by means of the mold assembly, the surface of the optical focusing system 20 is coated, so that the first and second reflection surfaces 203 and 205 have reflection to characteristics and the refractive surface 201 has a refractive characteristic, and the beam focusing surface 204 has a light transmission characteristic.

Figure 5B:
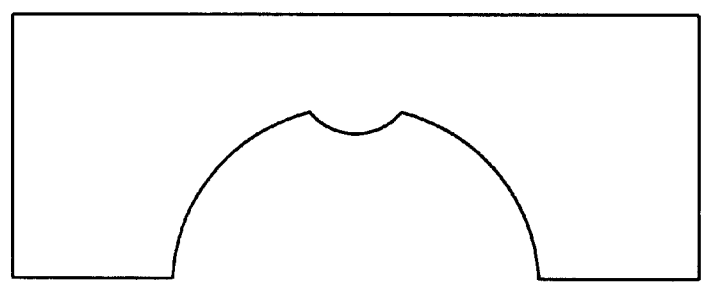

FIG. 5B is a view for explaining an upper mold fabrication method which is different from that explained with reference to FIG. 5A. An upper mold shown in FIG. 5B is for forming the refractive surface 201 and the first reflection surface of the optical focusing system 20, and is fabricated by using a diamond cutting and so on. Steps which do not explained with regard to FIG. 5B are the same as those explained with regard to FIG. 5A.

Figure 6:
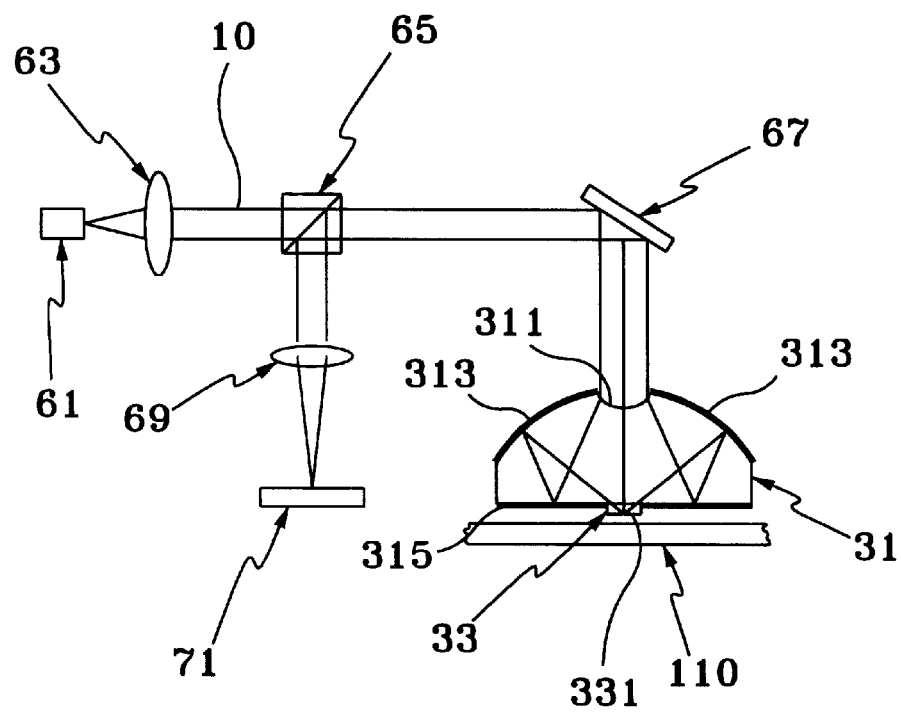
FIG. 6 is a view showing an optical system of an optical pickup adopting the optical focusing system of FIG. 3A.

FIG. 6 shows an optical pickup which has a general optical system and uses the optical focusing system 30 of FIG. 3A. In FIG. 6, a light beam 10 which is emitted from a laser light source 61 and has a wavelength of about 600 nm, is collimated by a collimating lens 63 to be parallel with an optical axis of the collimating lens 63, and then is incident to a beam splitter 65. The beam splitter 65 transmits the incident laser light beam toward a reflection mirror 67, which is arranged so that the laser light beam 10 incident from the beam splitter 65 is reflected toward a refractive surface 311 of the optical focusing system 30. In the optical focusing system 30, the refractive surface 311, first and second reflection surfaces 313 and 315 and a beam focusing portion 33 have the same optical characteristics as those described with reference to FIG. 3A, with respect to the light beam 10 incident from the reflection mirror 67. As a result, a light spot is formed on a focusing surface 331. Spacing between the optical focusing system 30 and an optical disk 110 is maintained by an air bearing and becomes less than 100 nm. A light spot formed on the focusing surface 331 generates a near field. The near field is changed by an information recording layer of the disk 110. The reflected light beam containing such a change is reflected from the reflection mirror 67 and the beam splitter 65 in sequence, and then is incident to a detection lens 69. The detection lens 69 transmits the light beam incident from the beam splitter 65 to a light receiving surface of a light detector 71.

In the case that the optical pickup of FIG. 6 is designed to be used for a magneto-optical disk, a separate polarizing beam splitter is inserted between the detection lens 69 and the light detector 71, and the light detector 71 is replaced by two light detectors. The polarizing beam splitter divides the light beam transmitted through the detection lens 69 into two linearly-polarized components. The two components are detected by the two light detectors, respectively.

Figure 7A:
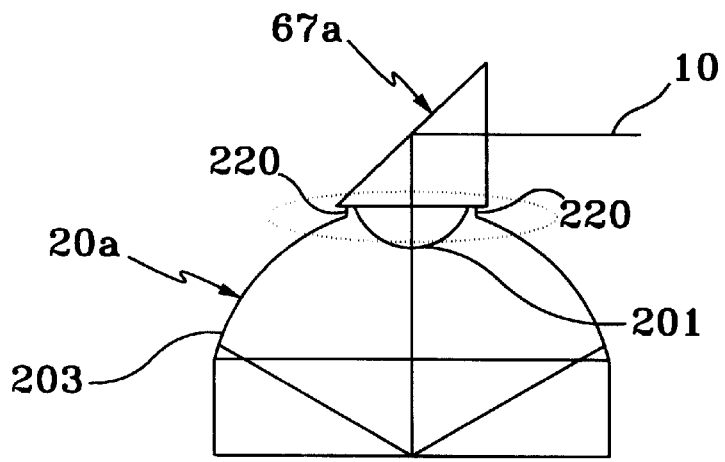
FIGS. 7A through 7C are views showing modifications of the optical focusing system of FIG. 2 which are appropriate for assembling in an optical pickup.
Figure 7B:
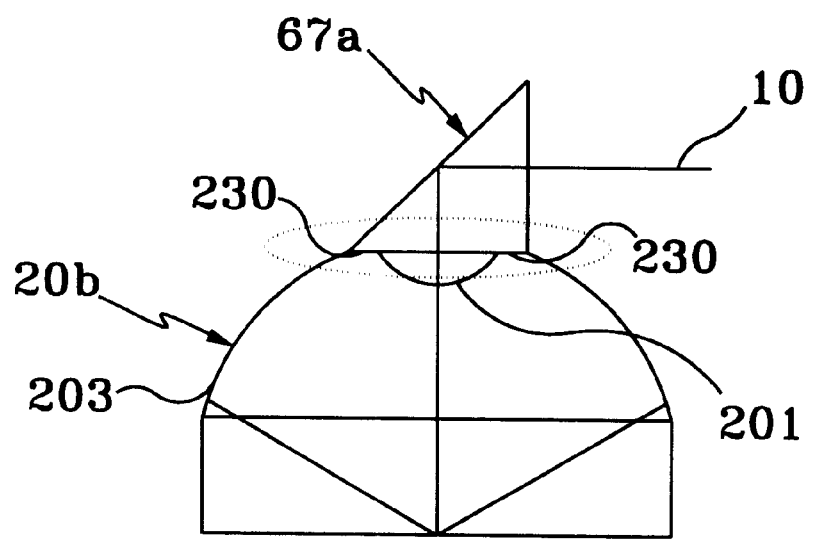
Figure 7C:
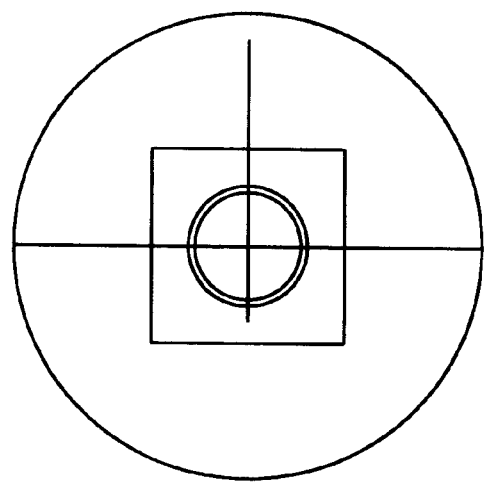

FIGS. 7A to 7C are views for explaining modifications of the optical focusing systems described with reference to FIGS. 2 through FIG. 4C to have a shape appropriate for use in an optical pickup. Specifically. FIGS. 7A to 7C illustrate optical focusing systems 20a and 20b modified from the optical focusing system 20 of FIG. 2. FIG. 7A depicts the optical focusing system 20a including a protrusion 220, FIG. 7B depicts the optical focusing system 20b including a supporter 230, and FIG. 7C is a projective view that is viewed from the upper side of the optical focusing system 20a or 20b. A reference numeral 10 denotes a laser light ray.

The protrusion 220 shown in FIG. 7A is formed at a portion where the refractive portion and the first reflection portion of the optical focusing system 20a meet and has a shape protruding toward a reflection mirror 67a. Like the protrusion 220, the supporter 230 shown in FIG. 7B is formed on an interface portion where the refractive portion and the first reflection portion of the optical focusing system 20b meet. But, the supporter 230 is formed by cutting the interface portion between the refractive surface and the first reflection surface so that a surface of the supporter 230 contacting with a reflection mirror 67b is parallel with the direction perpendicular to the optical axis of the optical focusing system. The protrusion 220 and the supporter 230 viewed at the direction of the optical axis of the optical focusing systems 20a and 20b have a shape of an annular band as shown in FIG. 7C.

Figure 8:
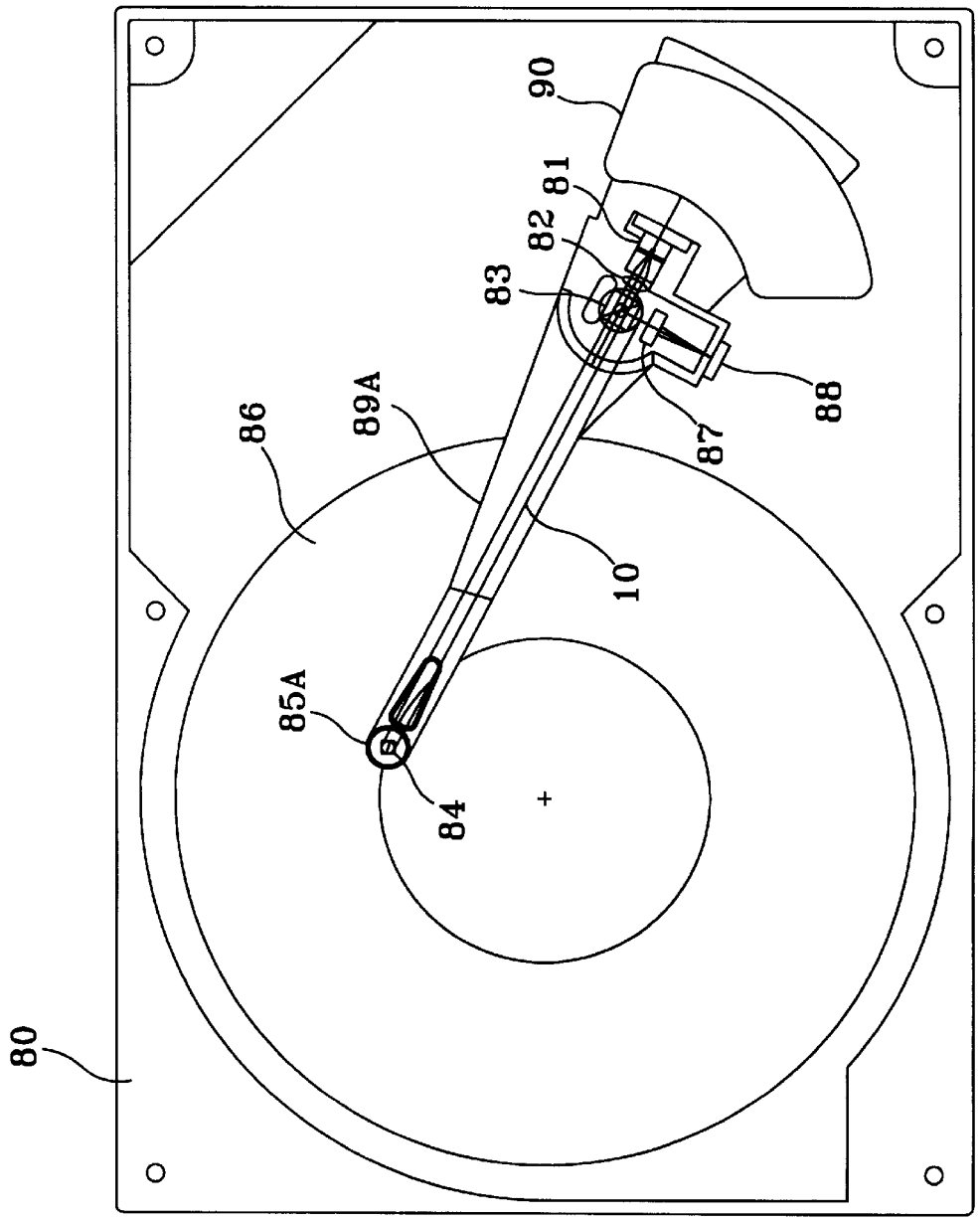
FIGS. 8 through 10B show structures of optical disk drives employing an optical focusing system according to the present invention.
Figure 9:
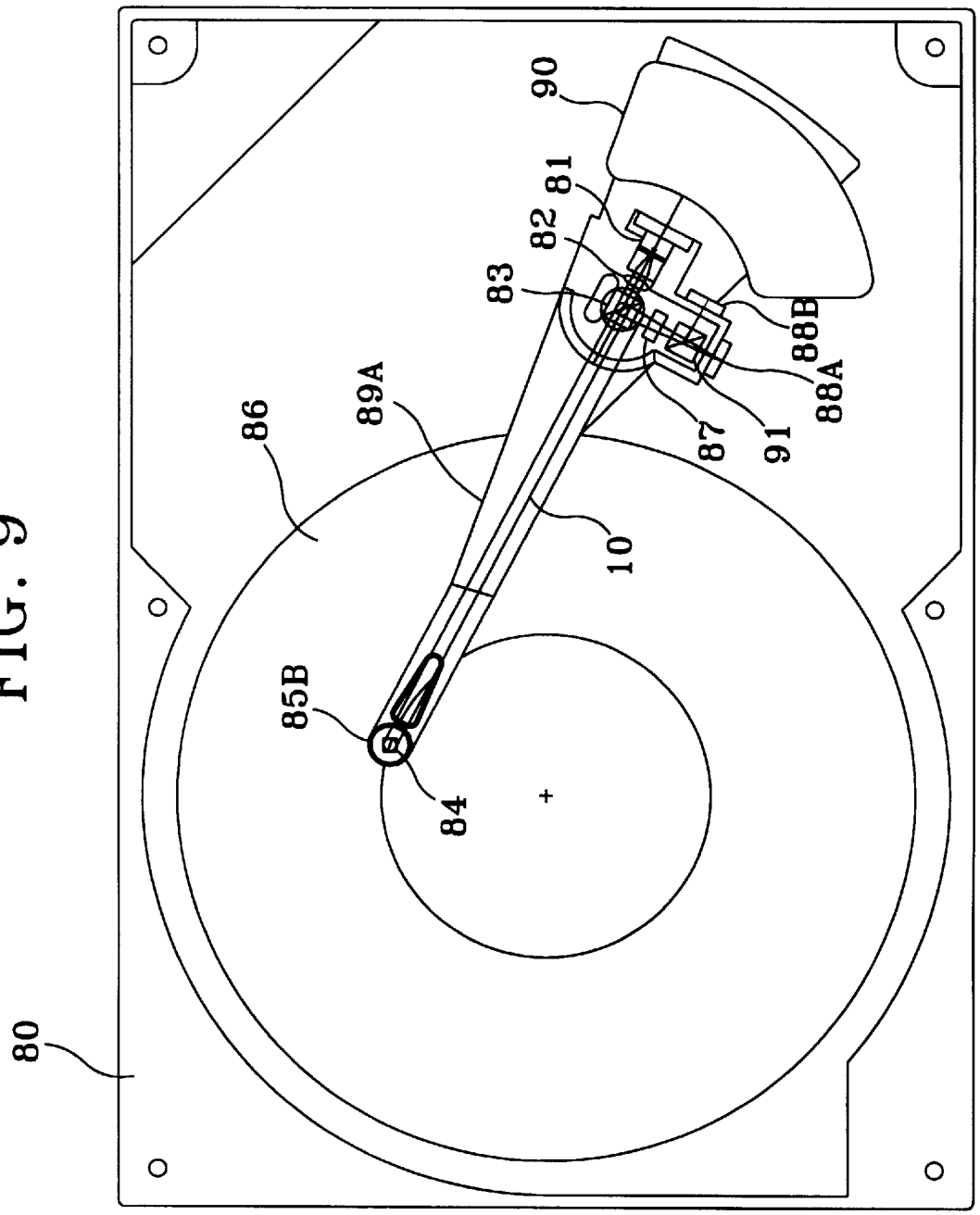

FIGS. 8 and 9 show the structures of optical disk drives in which an optical pickup having an optical focusing system according to the present invention is configured in a general hard disk drive. FIG. 8 shows an optical disk drive for an emboss-pit optical disk and a phase-change optical disk. A reference numeral 80 denotes a base. A reference numeral 81 denotes a laser diode, 82 denotes a collimating lens, 83 is a beam splitter, 84 a reflection mirror, 85A an optical focusing system of FIG. 2 according to the present invention, 86 an optical disk, 87 a detection lens, 88 a light detector, 89 a swing arm, and 90 a swing arm actuator, respectively.

FIG. 9 shows an optical disk drive for an emboss-pit optical disk, a phase-change optical disk and a magneto-optical disk. The reference numerals denote the same elements as those of FIG. 8. A reference numeral 85B denotes an optical focusing system shown in FIGS. 3A to 3C, 88A denotes a light detector for detecting an S-polarization component, 88B denotes a light detector for detecting a P-polarization component, and 91 denotes a polarizing beam splitter.

The optical system of the optical pickup employing the optical focusing system according to the present invention has been described with reference to FIG. 6. Thus, since the optical system and the function of the optical disk drive shown in FIGS. 8 and 9 are apparent to those skilled in the art, explanation of the operation of the optical disk drive of FIG. 8 or 9 is omitted.

Figure 10A:
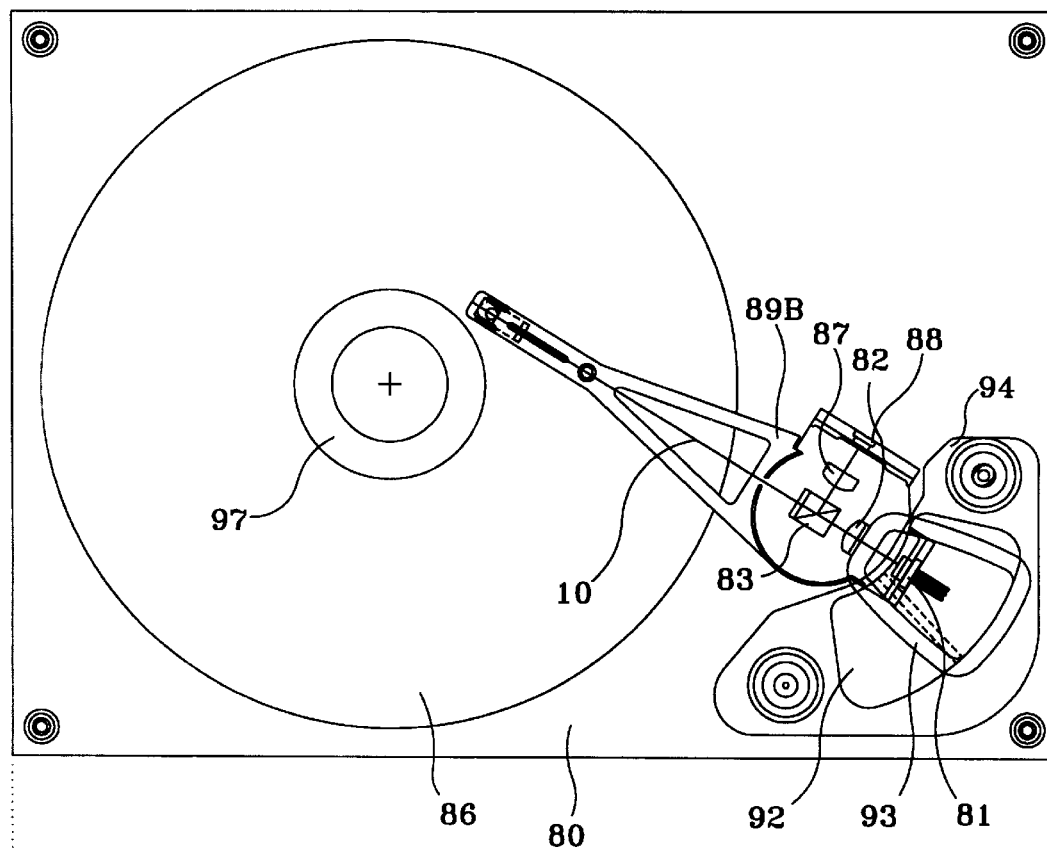
Figure 10B:
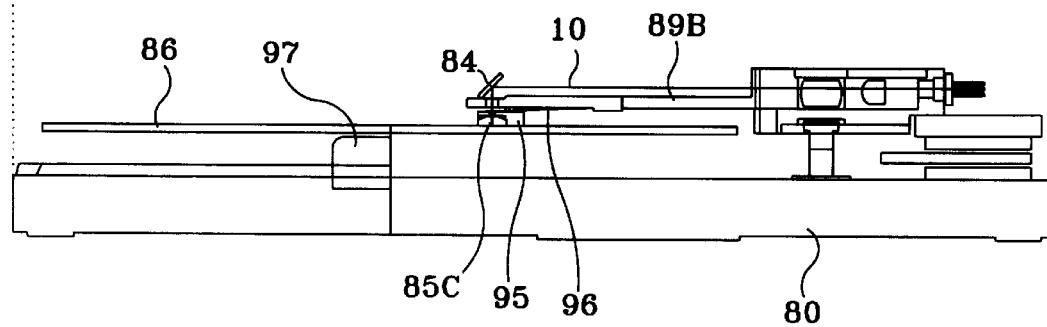

FIGS. 10A and 10B are views showing an optical disk drive using an optical head shown in FIGS. 4A to 4C. A reference numeral 85C denotes the same optical focusing system as one shown in FIGS. 4A through 4C. 89B denotes a swing arm, 92 a magnet, 93 a voice coil motor, 94 a yoke, 95 the same slider as the slider 65, 75A or 75B shown in FIGS. 4A to 4C, 96 a suspension, and 97 a spindle motor. When a magneto-optical disk is used in the optical disk drive shown in FIGS. 10A and 10B, light detectors 88A and 88B and the polarizing beam splitter 91 shown in FIG. 9 are additionally provided and used.

Figure 11A:
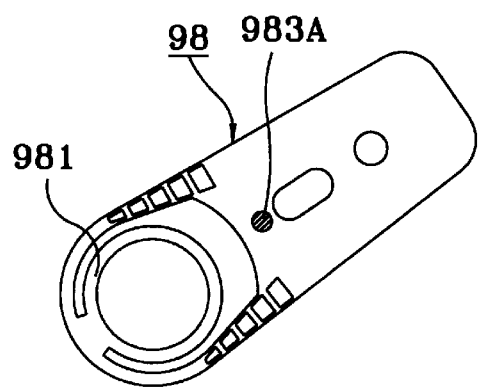
FIGS. 11A through 11C are views for explaining a flexure used in an optical disk drives shown in FIGS. 8 to 10B.
Figure 11B:
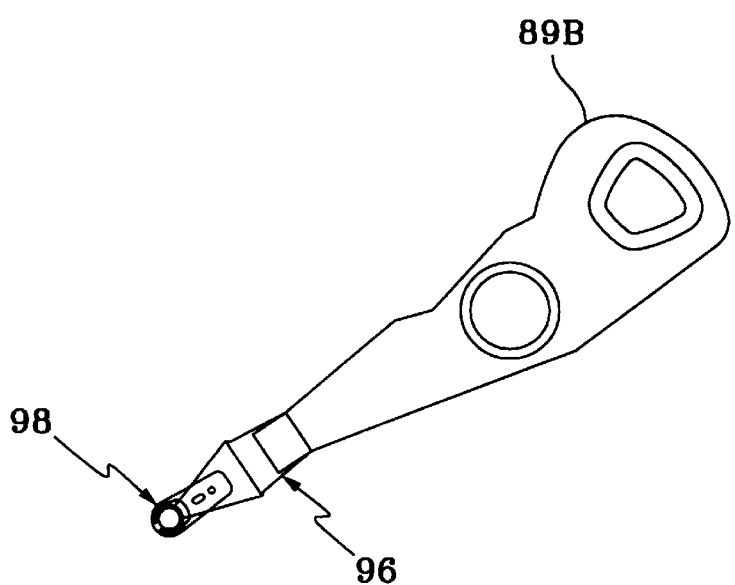
Figure 11C:
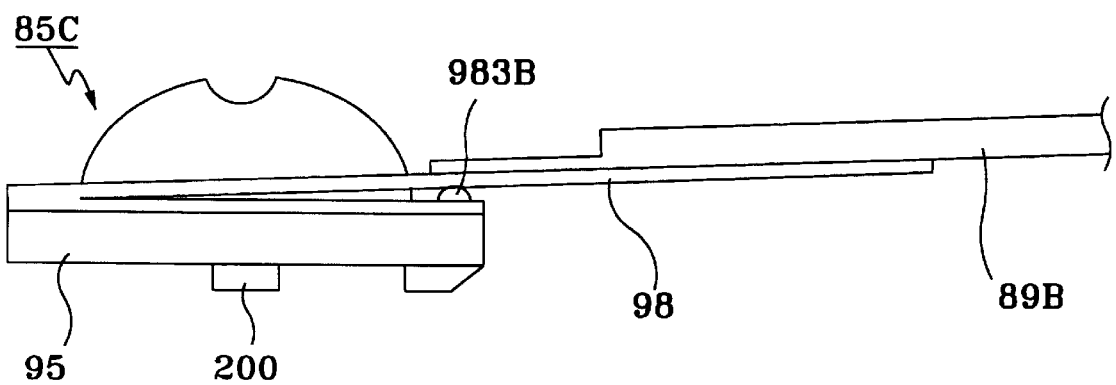

FIGS. 11A to 11C are views for explaining a flexure 98 used for suspending the optical focusing system 85C to the suspension 96 shown in FIG. 10A or 10B. The flexure 98 includes a holder 981 holding the optical focusing system 85C and a projection 983A as shown in FIG. 11A. The flexure 98 is fixed to the swing arm 89B by the suspension 96 as shown in FIG. 11B. The projection 983 is used as a pivot to movement of the flexure 98. That is, The projection 983 allows the flexure 98 to be pivot-moved centering around of itself. FIG. 11C is an enlarged view which shows the projection 983, together with the focusing element 85C, the slider 95 and suspension 96 shown in FIG. 10B. FIG. 11C shows an example that a projection 983B serving as a pivot is formed at the holder 981, differing from the projection 983A of the flexure 98 shown in FIG. 11A.

Even when an air bearing generated between the slider 95 and the optical disk as a result of air flow generated by rotation of the disk is not uniform due to clearance in manufacturing an optical disk drive or another factors, the flexure 98 secures that an interval between a surface 200 of the slider 95 forming a near field and the surface of the optical disk is always maintained constant.

Figure 12A:
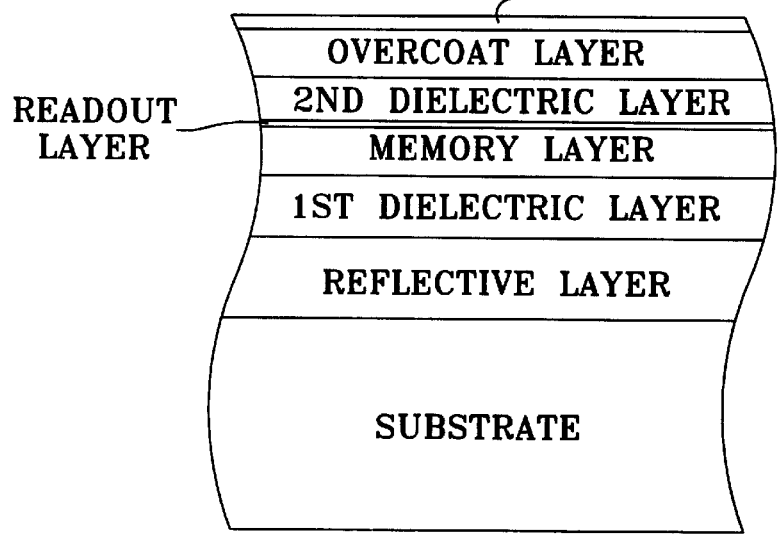
FIG. 12A is a view for explaining an optical disk to which information is recorded or read by an optical disk drive shown in FIGS. 8 to 10B.

FIG. 12A shows a layer structure of the magneto-optical disk 110 used in the present invention. U.S. Pat. No. 5,202,880 discloses a layer structure of an optical disk for a near field recording method which uses a near field in a recording and/or reading information. According to this patent, the optical disk for a near field recording method has a layer structure in which a reflective layer, a first dielectric layer, a memory layer, a second dielectric layer and an overcoat or protective layer are applied on a substrate in sequence. On the outer surface of the overcoat layer, a lubricant is put so that a slider carrying a head is smoothly slid without any damage on the surface of the optical disk. The magneto-optical disk used in the present invention further includes a readout layer which is disposed between the memory layer and the second dielectric layer of the optical disk having the layer structure referred to the above patent and amplifies only a desired signal. The readout layer is disclosed at pages 27–28 in the technical digest of "INTERNATIONAL SYMPOSIUM ON OPTICAL MEMORY 1995", held at Kanazawa city in Japan from Aug. 30, 1995 to Sep. 1, 1995.

Figure 12B:
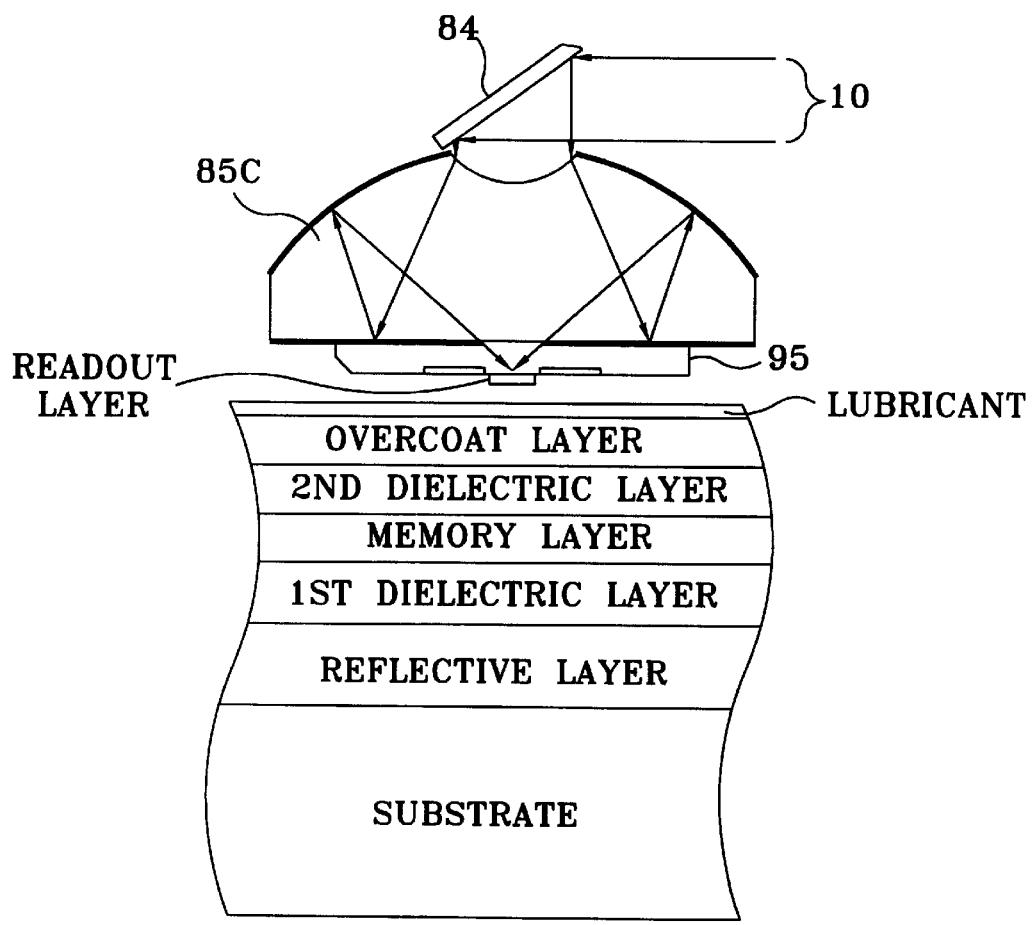
FIG. 12B is a view showing an optical focusing system having a readout layer on a surface of a near field forming portion, instead of an optical disk having a readout layer shown in FIG. 12A.
Figure 13A:
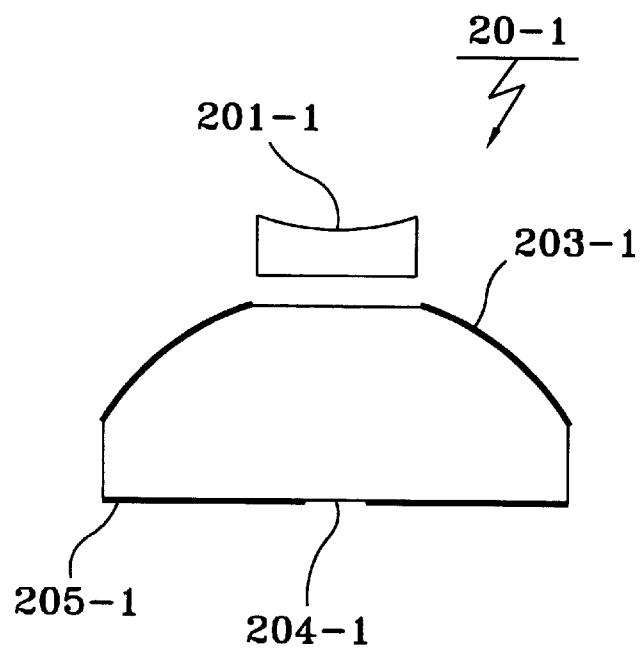
FIGS. 13A through 13D are views for explaining another modifications of an optical focusing system according to the present invention.
Figure 13B:
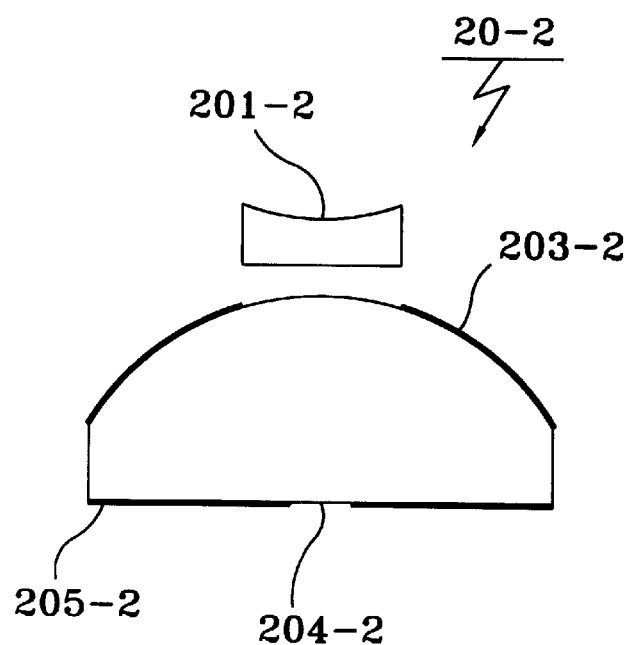
Figure 13C:
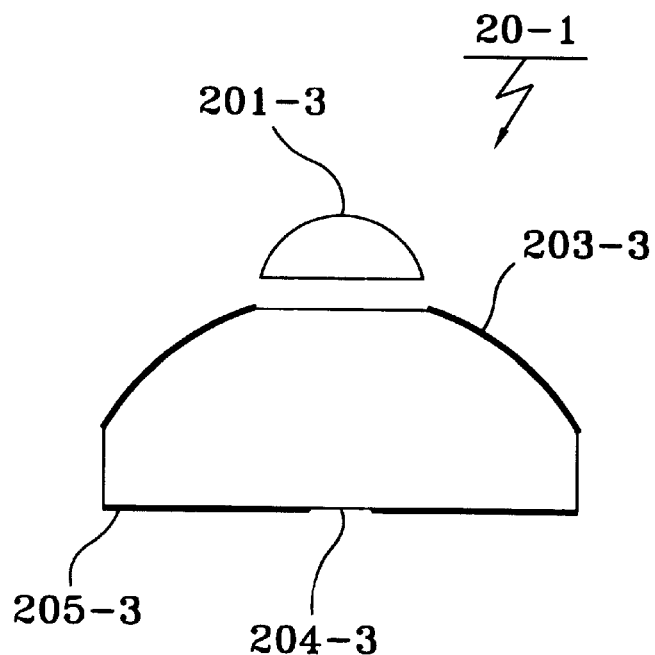
Figure 13D:
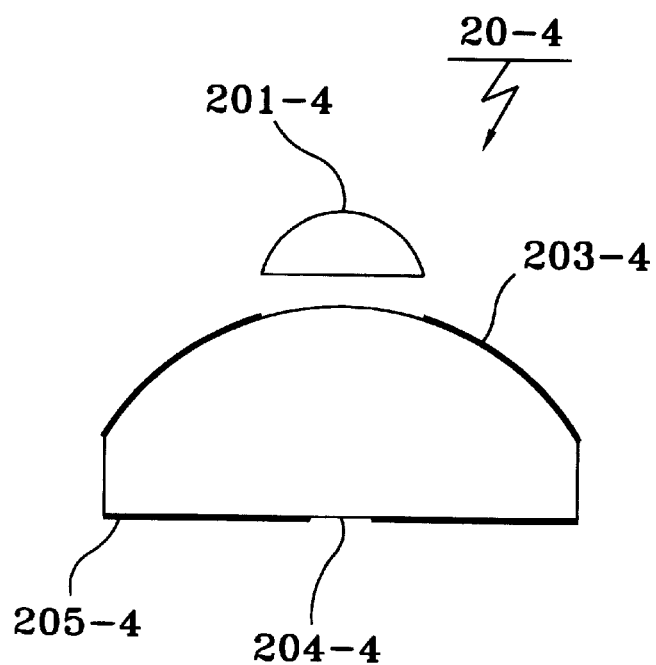

FIG. 12B is a view in which the optical disk disclosed in the above U.S. Patent is used and a readout layer is formed on a surface of the slider 95 that is located toward the optical disk and generates a near field.

FIGS. 13A to 13D shows other modifications of an optical focusing system according to the present invention. The optical focusing systems shown in FIGS. 13A to 13D are examples in which an optical element having a refractive surface and focusing element having a first and a second reflection surfaces and a beam focusing surface are separately fabricated. An optical focusing system 20-1 shown in FIG. 13A includes a concave-plano optical element having a concave refractive surface 201-1, and a focusing element having a first reflection surface 203-1, a beam focusing surface 204-1 and a second reflection surface 205-1. A surface of the focusing element facing toward the concave-plano optical element has a shape of a plane surface. An optical focusing system 20-2 of FIG. 13B includes a concave plano optical element having a concave refractive surface 201-2, and a focusing element having a first reflection surface 203-2, a beam focusing surface 204-2 and a second reflection surface 205-2. A surface of the focusing element of FIG. 13B which face toward the concave-plano optical element has a convex shape. An optical focusing system 20-3 of FIG. 13C includes a convex-plano optical element having a convex refractive surface 201-3, and a focusing element having a first reflection surface 203-3, a beam focusing surface 204-3 and a second reflection surface 205-3. A surface of the focusing element of FIG. 13C which face toward the convex-plano optical element has a shape of a plane surface. An optical focusing system 20-4 of FIG. 13D includes a convex-plano optical element having a convex refractive surface 201-4, and a focusing element having a first reflection surface 203-4, a beam focusing surface 204-4 and a second reflection surface 205-4. A surface of the focusing element of FIG. 13D which face toward the convex-plano optical element has a convex surface.

Figure 14A:
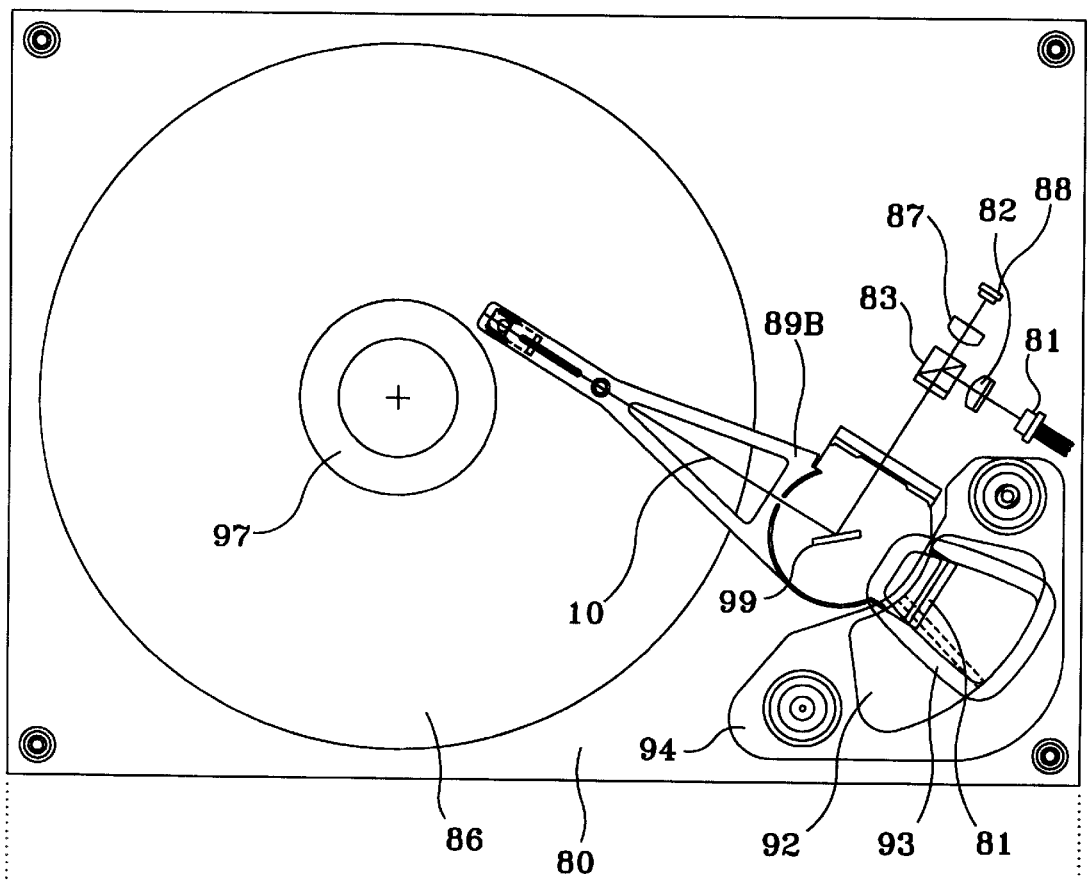
FIGS. 14A and 14B are views for explaining another optical disk drive according to the invention.
Figure 14B:
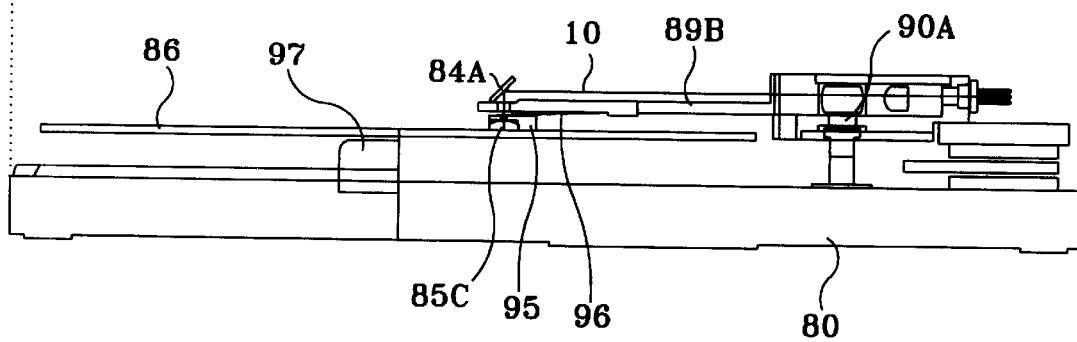

FIGS. 14A and 14B show another optical disk drive according to the invention. The optical disk drive shown in FIGS. 14A and 14B is modified from the optical disk drive of FIGS. 10A and 10B. In the optical disk drive of FIG. 14, the reference numerical 84A denotes a reflective mirror. The reflective mirror 84A is a galvano mirror and is driven by using an electromagnetic effect. The reflective mirror 84A is used for adjusting a tilt of the reflective mirror 84A with respect to a refractive surface of the optical focusing system 85C. For reference. U.S. Pat. No. 5,748,172 discloses that the electromagnetic effect is used for driving a micro-mirror array. An actuator 90A drives the reflective mirror 84A when requiring a fine tracking operation. A reflection mirror 99 is actuated by an unshown actuator or the actuator 90A, and transfers light beam between the beam splitter 83 and the reflective mirror 84A, even when a swing arm 89A moves. The reflection mirror 99 also is a galvano mirror. A laser diode 81, a collimating lens 82, beam splitter 83, a detection lens 87 and a light detector 88 are fixed on the base 80.

Till now, the present invention is explained with regard to optical focusing systems for generating a near field, but it is apparent to one skilled in the art to use the optical focusing systems of the invention an optical system for a far field.

As described above, an optical focusing system for forming a near field and an optical pickup employing the same according to the present invention, can reduce the size of a light spot forming a near field, even though a laser beam having a beam diameter smaller than that of the laser beam used for an existing optical focusing system for forming a near field. Accordingly, the optical pickup according to the present invention can record or reproduce information to an optical disk having a surface recording density of 10 Gbit/inch$^2$ or more. Also, even if an incident beam inclination occurs due to movement of the disk or the optical pickup, information can accurately be recorded on or reproduced from an optical disk. Assembling the optical focusing system into an optical pickup and the adjustment of the assembled optical system are easily performed. Further, the optical focusing system according to the present invention not only provides an extremely excellent angular characteristic (i.e. field characteristic) but also increases a numerical aperture, in comparison with other conventional optical systems, that is, a lens or a reflection mirror. Thus, the optical focusing system can be used for devices requiring such a field characteristic such as a high-density stepper, a microscope and so on.

While only certain embodiments of the invention have been specifically described herein, it will be apparent that numerous modifications may be made thereto without departing from the spirit and scope of the invention.

What is claimed is:

1. An optical focusing system for use with a light beam for forming a focused beam spot, the optical focusing system comprising:

a refractive surface on one side of the optical focusing system and having a first radius of curvature;

a first reflection surface on said one side, surrounding the refractive surface and having a second radius of curvature being different from the first radius of curvature;

a transparent beam focusing surface on a side opposite said one side of the optical focusing system; and a second reflection surface on said side opposite said one side and surrounding the beam focusing surface, wherein the refractive surface refracts an incident light beam, the second reflection surface reflects light refracted by the refractive surface toward the first reflection surface, and the first reflection surface focuses light reflected from the second reflection surface on the beam focusing surface, as a focused beam spot.

2. The optical focusing system according to claim 1, wherein the refractive surface has the same optical axis as that of the beam focusing surface.

3. The optical focusing system according to claim 1, wherein an absolute value of the first radius of curvature is less than an absolute value of the second radius of curvature.

4. The optical focusing system according to claim 3, wherein the refractive surface has a concave shape recessed toward the beam focusing surface.

5. The optical focusing system according to claim 4, wherein the refractive surface contacts with the first reflection surface.

6. The optical focusing system according to claim 4, wherein the refractive surface is spaced apart from the first reflection surface.

7. The optical focusing system according to claim 3, wherein the refractive surface has a convex shape protruded toward a direction opposite to the beam focusing surface.

8. The optical focusing system according to claim 7, wherein the refractive surface contacts with the first reflection surface.

9. The optical focusing system according to claim 7, wherein the refractive surface is spaced apart from the first reflection surface.

10. The optical focusing system according to claim 1, wherein the first reflection surface has an aspherical shape.

11. The optical focusing system according to claim 1, wherein each of the first and the second reflection surfaces intercepts external light.

12. The optical focusing system according to claim 1, wherein an aperture of the refractive surface is sufficiently smaller than that of the optical focusing system.

13. The optical focusing system according to claim 12, wherein the aperture of the refractive surface is less than about 1 mm.

14. The optical focusing system according to claim 13, wherein the aperture of the refractive surface is about 0.8 mm.

15. The optical focusing system according to claim 12, wherein the refractive surface, the first and second reflection surfaces have shapes to allow the optical focusing system to form a beam spot of a size for generating a near field on the beam focusing surface.

16. The optical focusing system according to claim 15, wherein the optical focusing system comprises, a focusing element including the refractive surface, the first and second reflection surfaces; and a beam focusing portion including a circular surface which is protruded as compared with the second reflection surface and serves as the beam focusing surface.

17. The optical focusing system according to claim 16, wherein the beam focusing portion has a shape appropriate for attaching a magnet coil thereto.

18. The optical focusing system according to claim 16, wherein the focusing element and the beam focusing portion have a refractive index of about 1.84, and a thickness of the beam focusing portion protruded from the second reflection surface is within the range of about 0.1 to 0.2 mm.

19. The optical focusing system according to claim 18, wherein the thickness of the beam focusing portion is preferably 0.13 mm, and an aperture of the beam focusing surface is about 0.5 mm.

20. The optical focusing system according to claim 15, wherein the optical focusing system comprises, a focusing element including the refractive surface, the first and second reflection surfaces; and a beam focusing portion including a circular surface which is protruded as compared with the second reflection surface and serves as the beam focusing surface, and having a convex shape protruded toward the refractive surface.

21. The optical focusing system according to claim 20, wherein the beam focusing portion has a shape appropriate for attaching a magnet coil thereto.

22. The optical focusing system according to claim 20, wherein the focusing element has a refractive index less than that of the beam focusing portion.

23. The optical focusing system according to claim 22, wherein the focusing element has a refractive index of about 1.55, and the beam focusing portion has a refractive index of about 3.

24. The optical focusing system according to claim 1, wherein the second reflection surface is substantially a plane surface.

25. The optical focusing system according to claim 24, wherein the beam focusing surface is substantially a plane surface.

26. The optical focusing system according to claim 25, wherein the beam focusing surface contacts with the second reflection surface.

27. An optical pickup for recording and/or reading information to an optical disk using a focused beam spot, the optical pickup comprising:

a light source;

an optical detector;

an optical head comprising, a refractive surface on one side of the optical head and having a first radius of curvature;

a first reflection surface on said one side, surrounding the refractive surface and having a second radius of curvature being different from the first radius of curvature;

a transparent beam focusing surface on the other side of the optical head; and a second reflection surface on said other side and surrounding the beam focusing surface, wherein the refractive surface refracts an incident light beam, the second reflection surface reflects light refracted by the refractive surface toward the first reflection surface, and the first reflection surface focuses light reflected from the second reflection surface on the beam focusing surface as a focused beam spot, an optical path changer which transfers a light beam emitted from the light source to the refractive surface of the optical head and transfers a light beam outgoing from the refractive surface to said optical detector; and a support which elastically supports the optical head so that the optical head moves in a direction perpendicular to said optical disk, within a predetermined distance from a recording surface of said optical disk.

28. The optical pickup according to claim 27, wherein the refractive surface has the same optical axis as that of the beam focusing surface.

29. The optical pickup according to claim 27, wherein an absolute value of the first radius of curvature is less than an absolute value of the second radius of curvature.

30. The optical pickup according to claim 29, wherein the refractive surface has a concave shape recessed toward the beam focusing surface.

31. The optical pickup according to claim 29, wherein the refractive surface has a convex shape protruded toward the opposite direction to the beam focusing surface.

32. The optical pickup according to claim 27, wherein the refractive surface, the first and second reflection surfaces have shapes to allow the optical focusing system to form a beam spot of the size for generating a near field on the beam focusing surface.

33. The optical pickup according to claim 32, wherein the optical head comprises, a focusing element including the refractive surface, the first and second reflection surfaces; and a slider including the beam focusing surface, and having a shape to generate an air-bearing which floats the optical head on said optical disk as a result of air flow generated on a surface of said optical disk.

34. The optical pickup according to claim 33, wherein the slider has the same refractive index as that of the focusing element.

35. The optical pickup according to claim 33, wherein the slider includes a groove appropriate for attaching a magnet coil used for recording information on a magneto-optical disk.

36. The optical pickup according to claim 33, wherein the slider has a refractive index less than that of the focusing element.

37. The optical pickup according to claim 32, wherein the optical head comprises, a focusing element including the refractive surface, the first reflection surface; and a slider including the second reflection surface and the beam focusing surface, and having a shape to generate an air-bearing which floats the optical head on said optical disk as a result of air flow generated on a surface of said optical disk.

38. The optical pickup according to claim 37, wherein the slider has the same refractive index as that of the focusing element.

39. The optical pickup according to claim 38, wherein the slider has the second reflection surface positioned on the surface of the slider facing said optical disk.

40. The optical pickup according to claim 32, wherein an aperture of the refractive surface is sufficiently smaller than that of the second reflection surface.

41. The optical pickup according to claim 40, wherein the aperture of the refractive surface is less than about 1 mm.

42. The optical pickup according to claim 41, wherein the aperture of the refractive surface is about 0.8 mm.

43. The optical pickup according to claim 32, wherein an interval between the beam focusing surface and said optical disk is less than or equal to a wavelength of light beam emitted from the optical source.

44. The optical pickup according to claim 43, wherein the interval between the beam focusing surface and said optical disk is maintained to be less than about 100 nm.

45. The optical pickup according to claim 32, wherein said supporting means comprises a flexure which pivot-supports the optical head to maintain the interval between the beam focusing surface and said optical disk to be constant.

46. The optical pickup according to claim 45, wherein the flexure comprises, a holder which holds the optical head; and a projection formed on the holder, to allow the flexure to be pivot-moved centering on the projection.

47. The optical pickup according to claim 27, wherein said optical path altering means shapes the light beam emitted from the light source in the form of a parallel beam, and transfers the parallel light beam to the refractive surface.

48. The optical pickup according to claim 47, wherein said optical path altering means comprises a reflector to allow a light beam incident to the refractive surface to enter the refractive surface in the direction substantially perpendicular to the refractive surface.

49. The optical pickup according to claim 48, wherein the reflector is installed on a portion where the refractive surface and the first reflection surface meet.

50. The optical pickup according to claim 27, wherein the optical detector includes a single light detector which detects a light beam reflected from an information recording surface of one of an embossed-pit optical disk and a phase change optical disk.

51. The optical pickup according to claim 27, wherein said optical detector includes two light detectors which detect a light beam reflected from an information recording surface of a magneto-optical disk.

52. A method for manufacturing an optical focusing system which uses with a light beam which forms a focused beam spot and comprises, a concave refractive surface on one side of the optical focusing system and having a first radius of curvature, a convex first reflection surface on said one side, surrounding the refractive surface and having a second radius of curvature being different from the first radius of curvature, a transparent beam focusing surface a side opposite said one side of the optical focusing system, and a second reflection surface on said side opposite said one side and surrounding the beam focusing surface, wherein the refractive surface refracts an incident light beam, the second reflection surface reflects light refracted by the refractive surface toward the first reflection surface, and the first reflection surface focuses light reflected from the second reflection surface on the beam focusing surface as a focused beam spot, the manufacturing method comprising:

fabricating a mold for the refractive surface and the first reflection surface from a primary mold plate.

53. The method according to claim 52, wherein in the fabricating, a diamond cutting method is used.

54. The method according to claim 52, wherein the fabricating comprises:

cutting the primary mold plate, to create a first mold for a shape of the first reflection surface;

forming, in the first mold, a through hole in which a second mold for a shape of the refractive surface is inserted; and inserting the second mold into the through hole formed in the first mold.

55. The method according to claim 54, wherein in the cutting, a diamond cutting method is used.

56. An optical disk drive for recording and/or reading information to/from an optical disk using a focused beam spot, the optical disk drive comprising:

a base;

a light source:

a reflector;

an optical detector;

an optical head comprising, a refractive surface on one side of the optical head and having a first radius of curvature;

a first reflection surface on said one side, surrounding the refractive surface and having a second radius of curvature being different from the first radius of curvature;

a transparent beam focusing surface on a side opposite said one side of the optical head; and a second reflection surface on said other side and surrounding the beam focusing surface, wherein the refractive surface refracts a light beam incident from the reflector, the second reflection surface reflects light refracted by the refractive surface toward the first reflection surface, and the first reflection surface focuses light reflected from the second reflection surface on the beam focusing surface as a focused beam spot, optical path changer which transfers a light beam outgoing from the refractive surface to said optical detector; and a support which elastically supports the optical head so that the optical head moves in a direction perpendicular to said optical disk, within a predetermined distance from a recording surface of said optical disk.

57. The optical disk drive according to claim 56, wherein the light source, said optical detector and said optical path changer are fixed on the base.

58. The optical disk drive according to claim 56, wherein the reflector allows a light beam outgoing from said optical path changer to enter the refractive surface in a direction substantially perpendicular to the refractive surface.

59. The optical disk drive according to claim 58, wherein the reflector is installed on a portion where the refractive surface and the first reflection surface meet.

60. The optical disk drive according to claim 58, wherein the reflector is a galvano mirror in which a tilt of a reflection surface of the mirror to the refractive surface of the optical head is adjusted using an electromagnetic effect.

61. The optical disk drive according to claim 60, wherein the optical disk drive further comprises an actuator which actuates the galvano mirror, to allow a fine-tracking operation of the optical head.

62. The optical disk drive according to claim 56, wherein the light source, said optical detector and said optical path changer are installed on the support.

63. The optical disk drive according to claim 56, wherein the reflector is installed on a portion where the refractive surface and the first reflection surface meet.

64. The optical disk drive according to claim 63, wherein the reflector is a galvano mirror in which a tilt of a reflection surface of the mirror to the refractive surface of the optical head is adjusted using an electromagnetic effect.

65. The optical disk drive according to claim 64, wherein the optical disk drive further comprises an actuator which actuates the galvano mirror, to allow a fine-tracking operation of the optical head.

66. An optical pickup for reading information from an optical disk using a near field, the optical pickup comprising:

an optical focusing system which generates the near field for reading information from said optical disk; and a readout layer attached on an optical surface of the optical focusing system facing toward said optical disk, which amplifies a reflected light beam containing information recorded on a recording layer of said optical disk.

* * * * *

UNITED STATES PATENT AND TRADEMARK OFFICE
CERTIFICATE OF CORRECTION

PATENT NO. : 6,266,315 B1
DATED : July 24, 2001
INVENTOR(S) : Chul-woo Lee et al.

It is certified that error appears in the above-identified patent and that said Letters Patent is hereby corrected as shown below:

Title page,
Item [57], ABSTRACT,
Line 18, after "beam" insert -- , --;
Line 20, change "to" to -- on/from --;
Line 22, delete "according to the present invention";
Line 24, delete "according to the invention";
Line 27, delete "according to the inven-";
Line 28, delete "ion";
Line 32, change "a" to -- the optical --.

Signed and Sealed this

Ninth Day of April, 2002

Attest:

JAMES E. ROGAN
*Attesting Officer*   *Director of the United States Patent and Trademark Office*